US010940633B2

(12) United States Patent
Schubert et al.

(10) Patent No.: US 10,940,633 B2
(45) Date of Patent: Mar. 9, 2021

(54) METHOD FOR PRODUCING A FILLED AND CLOSED CONTAINER, AND DEVICE FOR CARRYING OUT THE METHOD AND CONTAINER PRODUCED THEREBY

(71) Applicant: KOCHER-PLASTIK MASCHINENBAU GMBH, Sulzbach-Laufen (DE)

(72) Inventors: Otto Schubert, Ufhusen (CH); Bruno Egli, Wyssachen (CH); Martin Luescher, Moosleerau (CH); Alexander Muff, Buttisholz (CH)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 233 days.

(21) Appl. No.: 15/579,978

(22) PCT Filed: Apr. 8, 2016

(86) PCT No.: PCT/EP2016/000584
§ 371 (c)(1),
(2) Date: Dec. 6, 2017

(87) PCT Pub. No.: WO2016/198135
PCT Pub. Date: Dec. 15, 2016

(65) Prior Publication Data
US 2018/0147772 A1    May 31, 2018

(30) Foreign Application Priority Data
Jun. 11, 2015 (DE) .................. 10 2015 007 690.6

(51) Int. Cl.
*B29C 49/48* (2006.01)
*B29C 49/42* (2006.01)
(Continued)

(52) U.S. Cl.
CPC ........ *B29C 49/482* (2013.01); *B29C 49/4273* (2013.01); *B29C 49/46* (2013.01);
(Continued)

(58) Field of Classification Search
CPC .... B29C 49/482; B29C 49/4273; B29C 49/46
See application file for complete search history.

(56) References Cited

U.S. PATENT DOCUMENTS 2,202,073 A * 5/1940 Wollenweber ........ G01F 11/021
141/159
2,888,046 A * 5/1959 Piazze ..................... B65B 3/323
141/117
(Continued)

FOREIGN PATENT DOCUMENTS

DE          44 20 594      12/1995
DE     10 2008 028 772     12/2009
(Continued)

OTHER PUBLICATIONS

Machine Translation—DE 10 2012 104 267 (Year: 2013).*
(Continued)

*Primary Examiner* — Matthew J Daniels
*Assistant Examiner* — Wayne K. Swier
(74) *Attorney, Agent, or Firm* — Wenderoth, Lind & Ponack, L.L.P.

(57) ABSTRACT

A method produces a filled and closed container by the blow-moulding, filling and closing method. An initially open container part (52) is held in a mould (46) and has been vacuum-moulded and/or blow-moulded by a blow pin and is filled successively with media (74, 76) of different types, in particular viscosity, by metering units (12, 14) via its free, upwardly directed container-part opening (54). The filled-in media (74, 76) are separated from one another in the container part (52), and subsequently, by closing of the top
(Continued)

mould halves (56, 58) of the mould (46). A container top part (60) is moulded, and the container part (52) is closed, forming the container.

18 Claims, 5 Drawing Sheets

(51) Int. Cl.
    *B65B 3/02*     (2006.01)
    *B29C 49/46*     (2006.01)
    *B65B 3/30*     (2006.01)
    *B65B 7/16*     (2006.01)
    *B29L 31/00*     (2006.01)

(52) U.S. Cl.
    CPC ................ *B65B 3/022* (2013.01); *B65B 3/30* (2013.01); *B65B 7/16* (2013.01); *B29C 2049/4635* (2013.01); *B29C 2049/4664* (2013.01); *B29L 2031/712* (2013.01); *B29L 2031/718* (2013.01); *B65B 2220/14* (2013.01)

(56) References Cited

U.S. PATENT DOCUMENTS

| | | | | |
|---|---|---|---|---|
| 3,179,269 | A * | 4/1965 | Arnett | B65B 21/22 |
| | | | | 414/411 |
| 3,744,538 | A * | 7/1973 | Nasica | B65B 3/32 |
| | | | | 141/242 |
| 4,628,974 | A * | 12/1986 | Meyer | B67D 1/0021 |
| | | | | 141/103 |
| 5,431,201 | A * | 7/1995 | Torchia | A61J 1/20 |
| | | | | 141/100 |
| 5,494,692 | A | 2/1996 | Beyer et al. | |
| 8,985,164 | B2 * | 3/2015 | Seeman | B65B 57/145 |
| | | | | 141/5 |
| 2003/0009987 | A1 * | 1/2003 | Germick | B65B 3/326 |
| | | | | 53/437 |
| 2003/0233812 | A1 * | 12/2003 | Rogers | B65B 43/465 |
| | | | | 53/410 |
| 2007/0060666 | A1 * | 3/2007 | Taniguchi | A61K 8/042 |
| | | | | 523/105 |
| 2008/0142115 | A1 * | 6/2008 | Vogt | B67D 1/127 |
| | | | | 141/374 |
| 2008/0275404 | A1 * | 11/2008 | Hansen | B65D 1/095 |
| | | | | 604/217 |
| 2010/0094245 | A1 * | 4/2010 | Py | B65D 55/0818 |
| | | | | 604/415 |
| 2012/0060965 | A1 | 3/2012 | Poeschl et al. | |
| 2012/0275867 | A1 * | 11/2012 | Jones | F16B 13/142 |
| | | | | 405/259.6 |
| 2013/0302478 | A1 | 11/2013 | Anderson et al. | |
| 2013/0336726 | A1 | 12/2013 | Jones et al. | |
| 2014/0323975 | A1 * | 10/2014 | Thornton | B29C 70/68 |
| | | | | 604/192 |
| 2015/0128531 | A1 | 5/2015 | Auburger et al. | |
| 2015/0328824 | A1 * | 11/2015 | Morikami | B29C 49/12 |
| | | | | 425/524 |

FOREIGN PATENT DOCUMENTS

| | | | | |
|---|---|---|---|---|
| DE | 10 2012 104 267 | | 11/2013 | |
| DE | 102012104267 A1 * | | 11/2013 | ............. B67C 3/023 |
| DE | 10 2014 210 234 | | 12/2014 | |
| DE | 102014210234 A1 * | | 12/2014 | ............. B65B 43/52 |
| EP | 1 799 557 | | 6/2007 | |
| EP | 2 412 664 | | 2/2012 | |
| EP | 2 517 962 | | 10/2012 | |

OTHER PUBLICATIONS

Machine Translation—DE 10 2014 210 234 (Year: 2014).*
Machine Translation of DE102012104267 (Year: 2012).*
Machine Translation of DE102014210234 (Year: 2014).*
International Search Report (ISR) dated Jul. 7, 2016 in International (PCT) Application No. PCT/EP2016/000584.

* cited by examiner

METHOD FOR PRODUCING A FILLED AND CLOSED CONTAINER, AND DEVICE FOR CARRYING OUT THE METHOD AND CONTAINER PRODUCED THEREBY

FIELD OF THE INVENTION

The invention relates to a process for producing a filled and closed container, in particular in accordance with the blow molding, filling and closing process.

BACKGROUND OF THE INVENTION

Processes for blow molding, aseptic filling and hermetic sealing in a machine are used in particular in the field of pharmaceuticals, but are also used for soft drinks and chemical-technical products. In the process, patented by the company kocher-plastik and marketed worldwide by the company rommelag, has become known under the brand name "Bottelpack®". A tube is extruded in a first step analogous to traditional extrusion blow molding and taken over by the open blow mold. The main part of the blow mold closes and welds the bottom of the container shut. A specially shaped blow-mold-filling unit is set on the neck area, which unit seals the actual container area towards the not yet formed neck area. This blow mandrel is used to inflate the actual container using sterile air. Smaller containers, such as single-dose eye drop vials, are formed by vacuum, leaving the remaining outside part of the tube hot and plastically deformable during this process. During the next step, a filling mandrel is used to fill the product into the container. After the blow mold-filling unit has been lifted off, the head jaw of the mold tool closes and welds the container hermetically sealed. Simultaneously the desired head contour or closure contour is formed by a vacuum. When the blow mold is opened, the filled, finished container leaves the blow mold and the next production cycle can be started. The whole process is preferably conducted under aseptic conditions (stainless steel, sterile blowing and purge air, etc.), ensuring that the international standards (e.g. cGMP, FDA) for aseptic packaging are fulfilled ("Blasformen von Kunststoff-Hohlkörpern" [blow molding of hollow plastic bodies]; Michael Thielen, Klaus Hartwig and Peter Gust; Hanser-Verlag 2006).

A double-chamber vial produced using this process is known from EP 1 799 557 B1. The vial-like container is formed an elastically yielding plastic material having a metering chamber containing a single dispensing medium as a filled container part. One end of the metering chamber has a dispensing opening. The opposite end is connected via a connection point to a collapsible container head part, in which a gaseous expulsion medium, in particular in the form of air, is present. Upon compression of the container head part, the expulsion medium at least partially dispenses the dispensing medium from the metering chamber via the cleared dispensing opening to the outside for administration to a patient or the like. The mentioned connection point between the metering chamber as the one further container part and the container head part of the container is formed from a bottleneck, which is designed such that a capillary effect results. The capillary effect prevents a transfer of the discharge medium from the metering chamber into the container head part holding the expulsion medium in any case, regardless of the spatial position of the container.

In addition, DE 44 20 594 C2 has already proposed inserting an end piece in the form of a separating piston in the metering chamber between the stored dispensing medium and the bottleneck. At the top of the bottleneck, the container head part holding the absorbed expulsion agent adjoins a separating piston. The piston travels in the direction of cleared dispensing opening of the container and thereby helps facilitate the discharge of the container contents again in the form of a single dispensing medium from the container as soon as the air in the container head part is displaced through the bottleneck in the direction of the metering chamber by manually squeezing and thereby carries along the separating piston for the discharge process.

SUMMARY OF THE INVENTION

Based on this prior art, the invention addresses the problem of improving the known, technically proven solutions to the effect that an extended field of application for the BFS technology is created.

This problem is basically solved by a process having an initially open, blow-shaped by a blow mandrel and/or vacuum-shaped container part held in a mold tool that is filled via its clear, upwardly aligned container part opening by means of metering units in succession with media of different types, in particular different viscosities. The filled media are then separated from each other in the container part. Subsequently a container head part is formed by closing the head mold halves of the mold tool such that the container part is closed to form the container. In this way, at least two formulations different from each other can be introduced into only one container in the course of one filling process. The media are filled to different levels, remaining separated from one another even if the container is closed. It has proven to be particularly advantageous to use high-viscosity, slow-moving ointment-like products, including creams and gels, as media to be filled, and to fill these in layers one above the other into the container. The separation is maintained even when the container is closed.

If ointments having different viscosities are used as the medium to be filled in each case according to the inventive process, a compact filling of the ointment without air pockets within the container is desired. The subsequent extraction function of the container applicator produced in this way is not impaired due to the lack of air pockets. After the first layer or the first medium has been filled into the container part of the container, any mixing with the subsequent, overlying media layer has to be prevented, which is aided by the subsequently filled medium not being introduced in the container part of the container using a too strong filling jet. In such a way, a separating layer between the ointments can be produced as far as possible as a flat surface and also without cratering, which otherwise might encourage the mixing of the media layers in the container.

More preferably, only two media are introduced into the container to be formed. However, more than two media can be stored and separated from each other in the container to be closed. Also, the application need not be limited to high viscosity media and products. Rather, providing highly viscous media with low-viscosity media for separate container filling is possible. Basically, all types of media that can be separated as such and in particular due to their viscosity are suitable for the filling process according to the invention. In principle, therefore, depending on the application, all types of fluids as well as pasty and powdery or particulate substances are possible. Thus, in the context of the process according to the invention, the container is able to hold a highly viscous ointment and a pasty drug powder permanently separated from each other by a separating layer.

In the device according to the invention for preferentially performing the process, an independent metering unit is provided for every medium, depending on the number of media to be introduced into the container. In particular, the device according to the invention has at least two metering units for every dispensing medium to be filled in a container part of the container via the clear opening. Every metering unit is fixed on a displacement unit by at least one drive. The drive moves the metering unit in question at least partially via a slanted guide from a starting position to a dispensing position over the container part opening and then back to the starting position.

The invention also relates to a container, which is produced in particular according to the process described above including a device also as described above, and which is characterized in that in its closed container part at least two media are held in a superimposed arrangement and separated from each other. The pertinent media separation also is maintained once the composite media as a whole are, in turn in the same order as introduced into the container part, squeezed from the container part for an application or otherwise removed.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
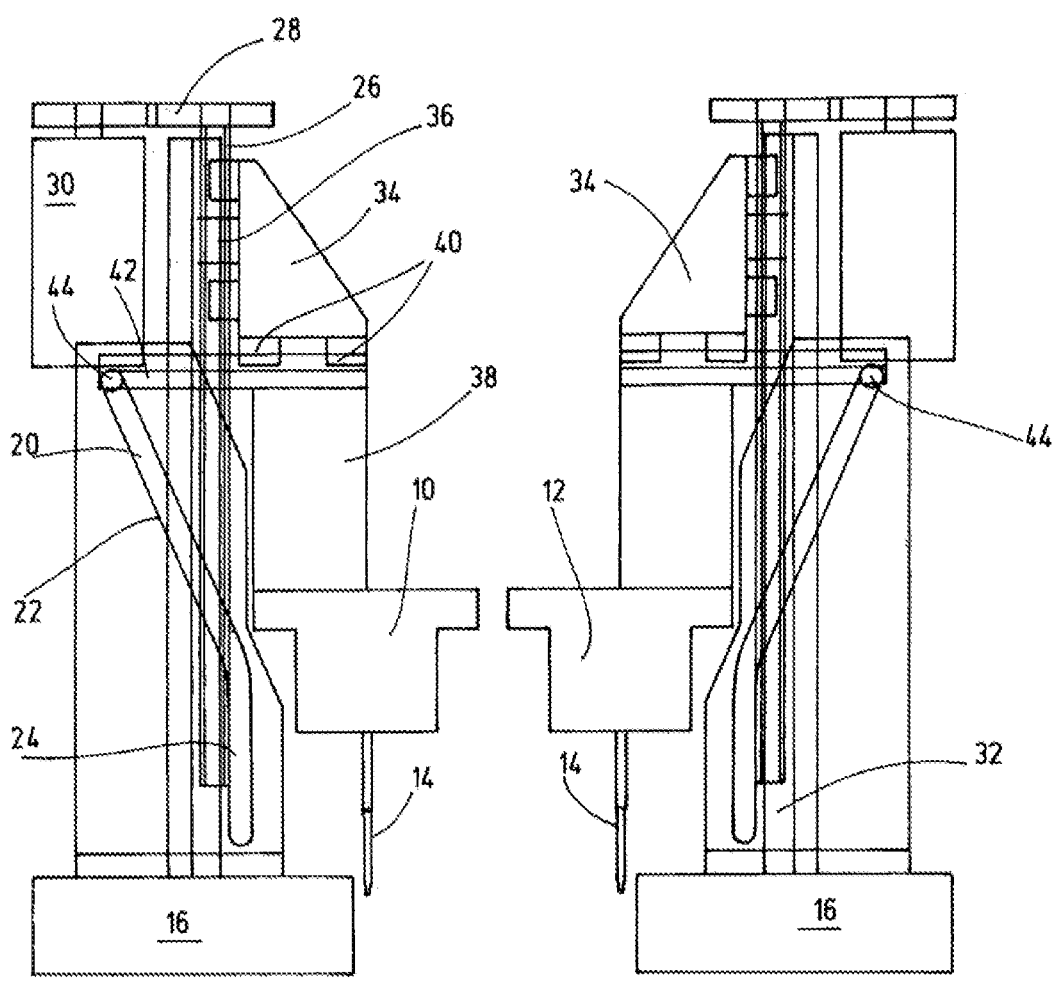
FIGS. 1 and 2 are side and plan views, respectively, of a manufacturing device for performing the manufacturing process according to an exemplary embodiment of the invention in a basic starting position.

The manufacturing device shown in a side view in FIG. 1 is intended for the supply of two different media in the form of ointments, whose viscosities should differ from each other. In this case, a first metering unit 10 is provided for supplying a first ointment, and a second metering unit 12 is provided for the second ointment. The respective metering units 10, 12 each have an identically designed filling mandrel 14 on their undersides. As the machine device for moving the metering unit 10 and the metering unit 12 are basically identically designed, the pertinent actuating device of the metering unit 10 is the only one to be explained in more detail, FIG. 2 shows a plan view of the manufacturing device according to FIG. 1.

On a machine table 16 of a blow molding, filling and sealing machine (not shown in any detail) a base support 18 is arranged as a stand. As shown in FIG. 2, base support 18 is formed of substantially U-shaped, mutually arranged wall parts shown in cross-section or in plan view. In the parallel walls of the base support 18 opposite to each other, a sliding block guide 20 is introduced continuously, which, as is apparent from FIG. 1, has, initially in the upper part, an inclined guide 22, which in its lower part transitions into a vertically extending, rail-shaped guide piece 24. A fictitious extension of the inclined guide 22 forms an included angle having an inclination angle of approx. 65° with the top of the machine table 16. Furthermore, a drive spindle 26, which can be driven via a gear 28, for example in the form of a belt drive, which in turn can be driven by an electric motor 30 is guided approximately centrally within the base support 18. In place of the belt drive, a gear transmission or the like can also represent the gear 28.

Figure 2:
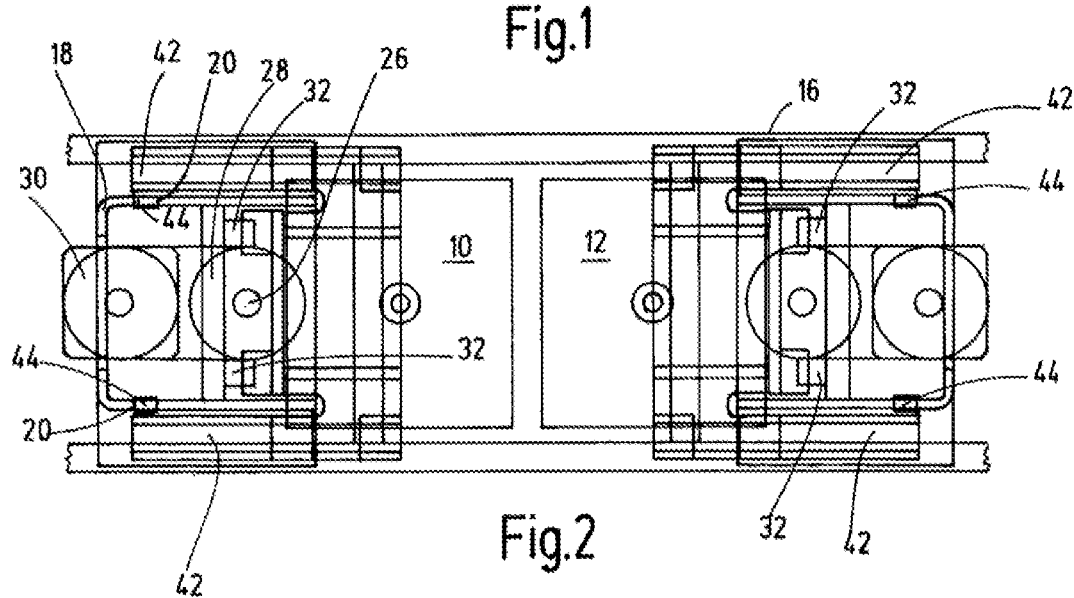

As is further apparent from FIGS. 1 and 2, two guide rods 32 are arranged within the U-shaped base support 18 and in a vertical arrangement extending in parallel to the rod-shaped drive spindle 26. Along guide rods 32, a console 34 is movably guided in the manner of a machine support and comprises the spindle drive 26 and its drive gears with a drive nut 36. If the electric motor 30 drives the console 34 via the drive spindle 26 in the manner of a support, it can be downwardly displaced from the uppermost position shown in FIG. 1. Viewed in the direction of FIG. 1, on the underside of the console 34, a displacement unit 38 is arranged, which displacement unit is guided longitudinally movably in the horizontal direction via a horizontal guide 40 in the console 34 beneath it. Furthermore, the displacement unit 38 has two rearwardly projecting guide webs 42, each carrying a guide roller 44 projecting in the direction of the base support 18. Each roller engages in the assignable sliding block guide 20. The metering unit 10 with its two guide webs extending above the intermediate displacement unit 38 is arranged on the underside of the console 34.

Figure 6:
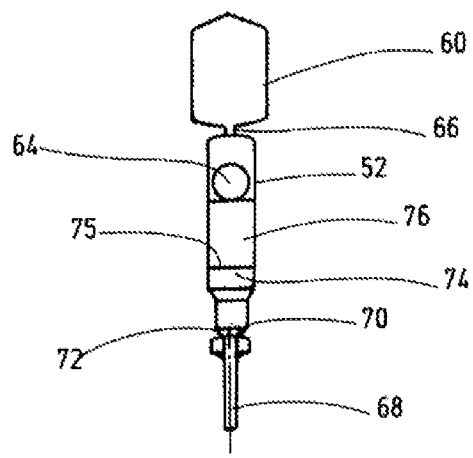
FIG. 6 is a side view of a container product manufactured according to an exemplary embodiment of the invention using manufacturing the device of FIGS. 1 to 5.

If the console 34 along with gear 28 and drive spindle 26 moves downwards as viewed in FIG. 1, after actuation of the electric motor 30, it includes the displacement unit 38 in this movement. Due to the sliding block guide 20, with which the guide rollers 44 of the displacement unit 38 engage, console 3 and displacement unit 38 simultaneously undergo a horizontal movement until the end of the inclined guide 22. At the end of inclined unit 22, in turn, the displacement unit 38 is moved only in the vertical direction along the two vertically extending guide pieces 24 of the sliding block guide 20. As shown in particular in the illustration of FIG. 3, the guide rollers 44 of the displacement unit 38 are in their fully extended dispensing position or dispensing position and come to a lower abutment with the end of each vertically extending guide piece 24 of the sliding block guide 20. In this position, the guide webs 42 of the displacement unit 38 within the horizontal guide 40 of the console 34 are in their fully extended position, and the metering unit 10 is located as shown in FIG. 3 above the mold tool 46 for a container as shown in FIG. 6.

The above-described moving mechanism is also implemented accordingly for the further metering unit 12 in this way. While FIG. 1 shows the initial state for both metering units 10, 12, FIG. 3 refers to the lowering and metering operation for a first ointment to be dispensed having a predeterminable viscosity, while the metering unit 12 with the other ointment is still in the starting position. In the illustration according to FIG. 4, the metering unit 10 is in the raised start or home position, and the metering unit 12 is in the lowered, dispensing position for metering the other ointment into the container.

Figure 3:
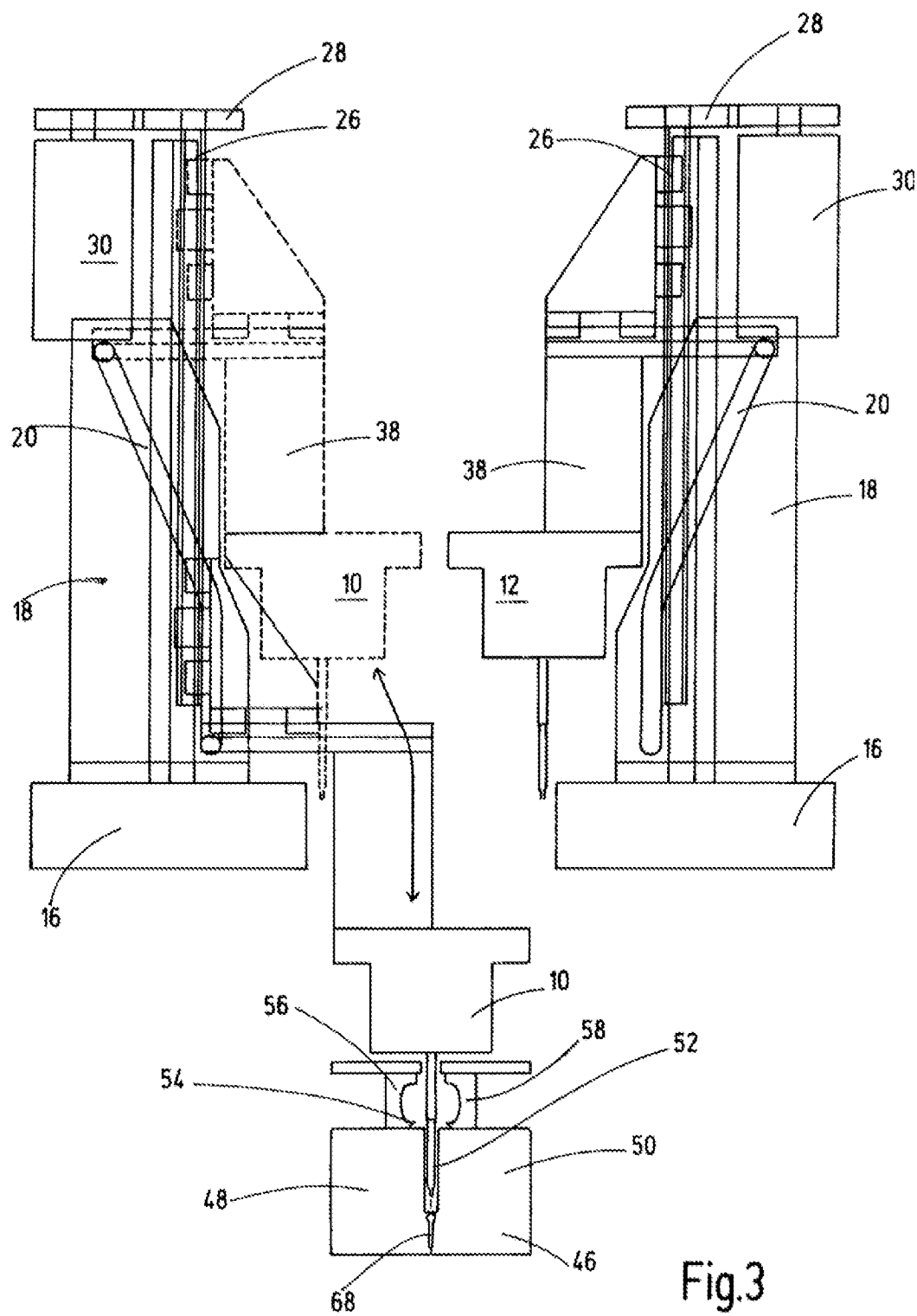
FIGS. 3 to 5 are side views of the manufacturing device of FIG. 1 in different manufacturing positions.
Figure 4:
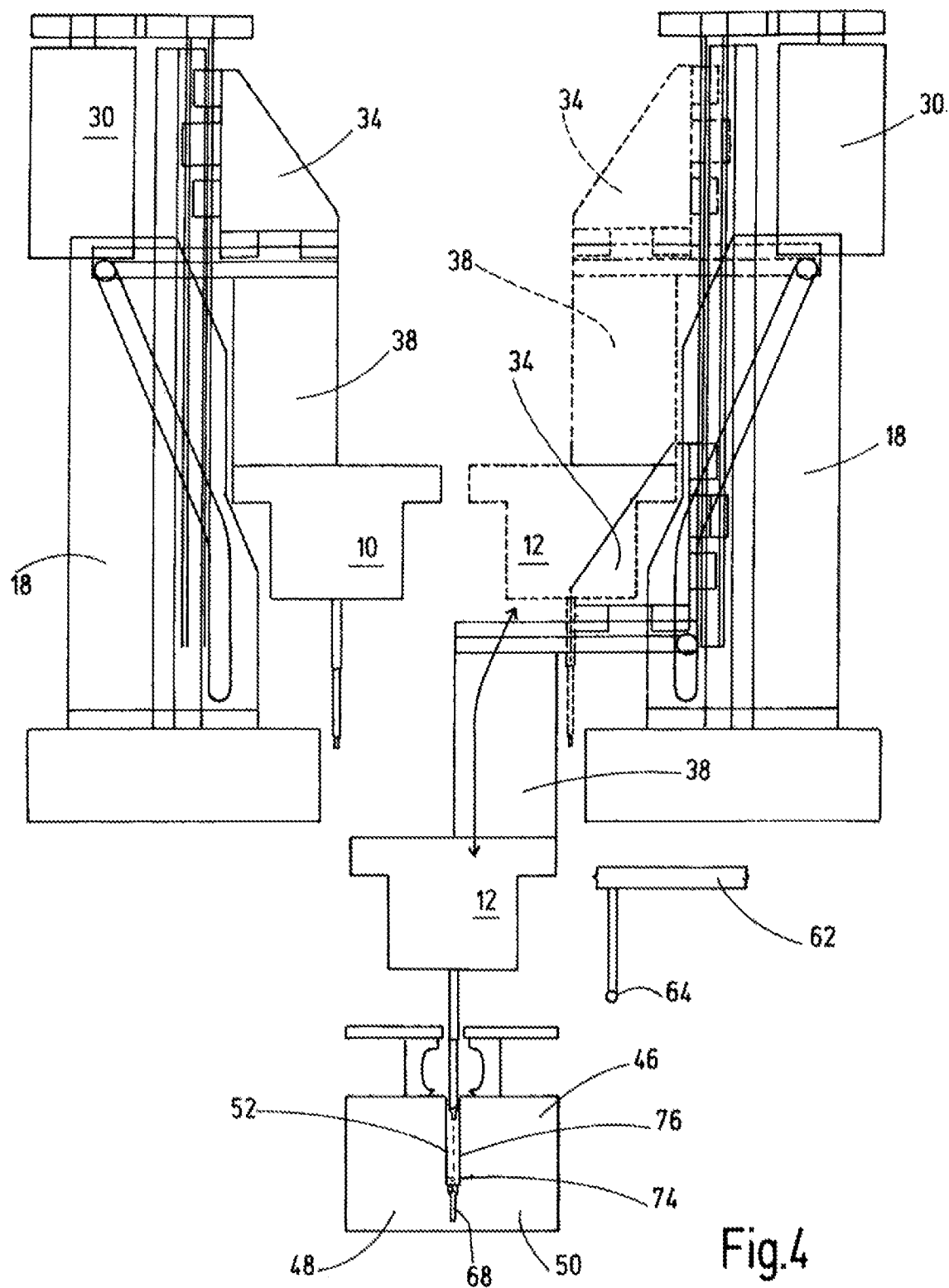
Figure 5:
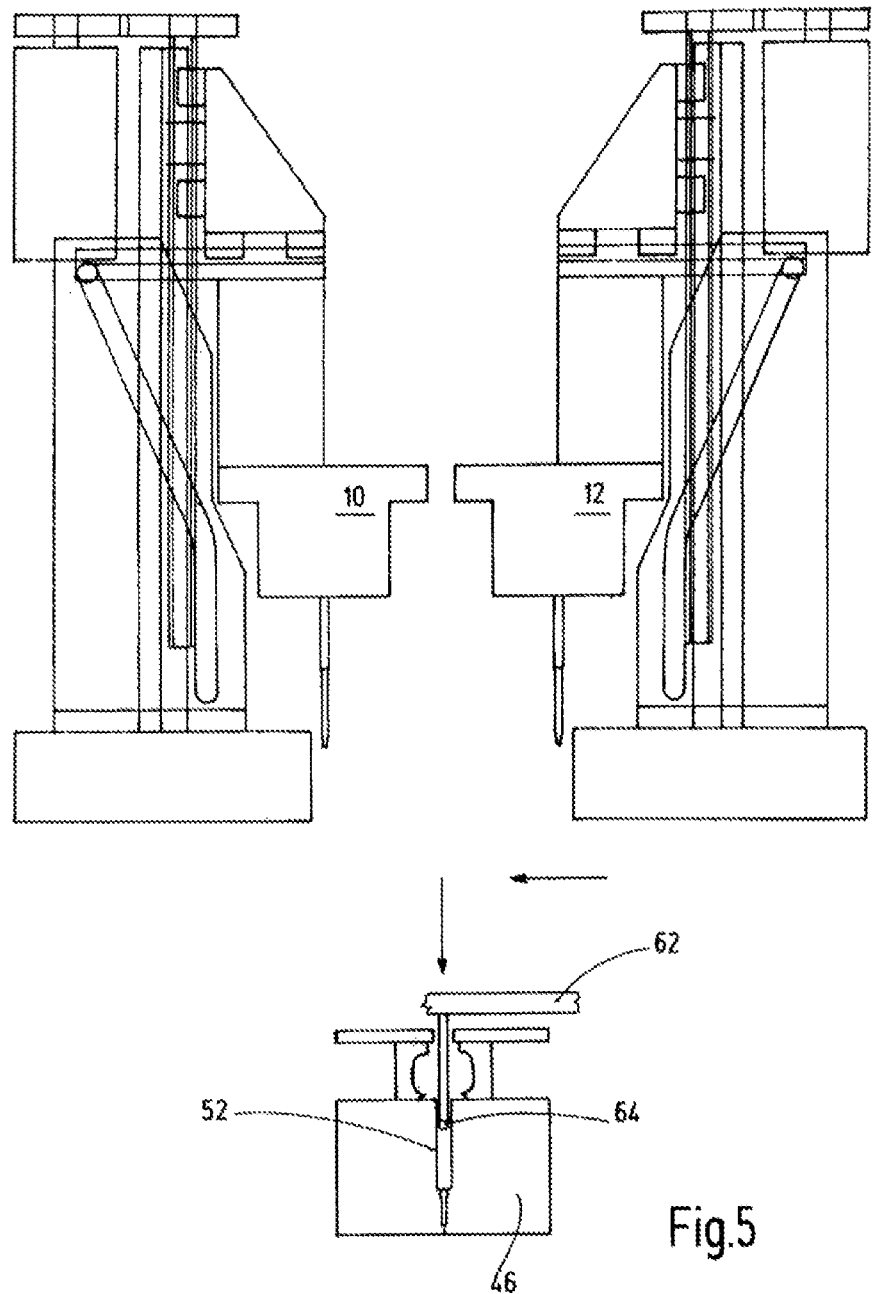

The mold tool 46 shown in FIGS. 3 to 5 include two mold halves 48, 50, which conjointly delimit a mold cavity for the blow molding of a container part 52 made of plastic material, which container part has an upwardly oriented opening 54. The respective filling mandrels 14 of the metering units 10, 12 can engage in the interior of the container part 52 through this opening 54 of the container part 52 for a delivery of media. Further, the mold tool 46 has on its upper side mutually corresponding head mold halves 56, 58 (cf. FIG. 3), which form the container head part 60 (cf. FIG. 6) of the container in its collapsed or closed state as soon as the clear opening cross-sections of the respective filling mandrels 14 have moved out of the overall mold 46, as shown in the illustration of FIG. 5. Preferably, before closing the head mold halves 56, 58, a ball 64 is placed on the top of the layered ointment composite using a vacuum gripping device 62. The ball serves as an end piece for the filled media and ointments respectively.

While at first the first ointment 74 was filled into the container part 52 using the metering unit 10, the second ointment 76 was subsequently introduced into the container part 52 in superposition via the metering unit 12, and then the ointment 76 introduced last by the metering unit 12 is provided with the ball 64 as an end part. As soon as the vacuum gripper 62 for the ball 64 is again disengaged from the mold tool 46 and its mold halves 48, 50, 56 and 58, the head mold halves 56, 58 can travel towards each other, with the opening 54 tapering into a narrow gap 66 as a capillary opening. Furthermore, closing the head mold halves 56, 58 causes the container head part 60 to be formed, and the container as a whole with the media and/or ointments it holds is hermetically sealed from the environment.

Below, the container produced by the inventive device according to FIGS. 1 to 5 is explained in more detail with reference to its illustration in FIG. 6, which refers to a finished container product. The container shown in FIG. 6 is formed of a transparent, elastically yielding plastic material, which alone or together with other containers can be manufactured, filled and closed preferably sterile in the manner of a conventional card-shaped container composite (not shown) by the device shown and illustrated, according to the illustrations of FIGS. 1 to 5. The container has a tubular, cylindrical metering chamber as a container part 52, which at its lower end in the drawing is closed by a toggle closure 68. Toggle closure 68 has a constricted predetermined breaking point 70, via which the toggle closure 68 can be turned off by hand, to clear the discharge port 72 at the lower end of the container part 52. Viewed in the direction of FIG. 6, at least one ointment 74 is arranged on the bottom of the container part 52, which is separated by a horizontal separating surface 75 from a topmost further ointment 76. The ball 64 rests as an end part on the top or surface. As is clear from the illustration of FIG. 6, upon clearing the dispensing opening 72 of the container, one after another first the ointment 74 and then the ointment 76 is discharged, while the ball 64 remains in the container part 52 of the container. Due to the downwardly conically tapered discharge opening 72, it can easily be introduced in body openings, such as in a nostril or the like.

The opposite end of the container part 52 is connected via the junction 66 to the compressible container head part 60, in which a particular gaseous expulsion medium, in the present case in the form of air, is present. When the container head part 60 is compressed by hand, the expulsion medium stored there displaces the ointment to be dispensed from the container part 52 via the discharge opening 72 for an application process outwards into the environment. The ball 64 is carried along. The connection point 66 between the container part 52 and the container head part 60 is formed from a bottleneck such that a capillary effect results, which prevents the transfer of the respective delivery medium from the container part 52 into the container head part 60, regardless of the spatial position of the container. Likewise, the expulsion medium cannot unintentionally be moved in the direction of the container part 52 holding the ointments 74, 76 without squeezing the container head. Not shown and explained in detail, is the fact that the ball 64 may be punched out of the plate-shaped toggle fastener 68. The toggle closure 68 originally then has an approximately centrally arranged shaped ball part (not shown). The respective ball 64 can be removed from the toggle closure 68 for a subsequent process operation as soon as the pertinent container with the toggle closure 68 still containing the ball 64 has left the molding machine including the mold tool 64.

The process according to the invention will now be explained in more detail below with reference to the device shown, together with the container product. As already explained, the process for producing the filled and closed container relates to a blow molding, filling and closing process (BFS process), in which an initially open, container part 52 held in a mold tool 46 is filled in succession with media 74, 76, of preferably different viscosity, such that in the container part 52 the filled media 74, 76 are separated from each other. The container part 52 is subsequently closed to form the entire container. Basically, media for filling in the container part 52 having high-viscosity properties, such as ointment products are preferable.

Further, for the metered dispensing of the respective medium, in particular in the form of the ointment products 74, 76, a volumetric media or ointment metering is used. A compact air-free filling, starting from the tube or filling mandrel 14 of the respective applicator in the form of metering units 10, 12, must be implemented. Such a volumetric media metering is shown by way of example in DE 10 2008 028 772 A1, which relates to a device for filling containers comprising a device for feeding product to at least one metering device in the form of the metering units 10, 12, which forms a flow path in which a metering valve, which can be opened at least for the period of metering operations, is arranged to deliver metered quantities of the media or other product to the respective containers via at least one filling line. In this case, the known metering device for volumetric media metering in the flow path downstream of the metering valve has a device for selectively generating a suction effect in the flow path. A control device is provided, which activates the element generating the suction effect for a metered dispensing action according to metering actions completed by closing the metering valve.

As shown in particular in the illustration according to FIG. 3, the filling mandrel 14 of the metering unit 10 must be positioned in the container part 52 at a sufficient distance from the eventually reached filling level and performs no product-specific movement during the filling, or only a small one if at all. The pressure range of the metering required for this purpose is determined product-specifically on the basis of the media product or ointment product.

Similar to the foregoing description and shown in FIG. 4 by way of example, the medium and/or the ointment 76, is subsequently filled by a volumetric ointment dosage, as presented above, via the metering unit 12 into the container part 52 of the ointment 74, for which both the metering rate and the volume flow can be controlled. To prevent unwanted cratering or mixing with the already filled ointment 74, the filling is performed at a lower pressure range than the filling of the ointment 74. By synchronizing the controlled metering and the movement of the filling mandrel 14 of the metering unit 12 during filling, again, a compact, preferably air bubble-free metering in the tube in the form of the container part 52 can be implemented. To implement the synchronization between the metering speed and the movement of the respective filling mandrel 14, the "piston stroke"

of the metering unit 12 and the movement of the filling mandrel 14 itself are performed by the already described servo drives in the form of an electric motor 30, gear 28 and drive spindle 26 using a suitable control and regulating device (not shown).

Giving priority to the lowering stroke and filling process in the mold tool 46 described above, the metering units 10, 12 must be alternately moved horizontally into the central position via the opening 54 of the container part 52 in the mold tool 46. This movement is achieved by a synchronized movement of the horizontal and vertical axes using the sliding block guide 20 along a predetermined defined path movement. Due to the oblique guide 22 of the sliding block guide 20, no need exists for an additional horizontal cross stroke, resulting in a reduction of the travel times between their respective basic and dispensing positions of the respective metering units 10, 12.

In principle, handling systems, such as robot arms, can be used to move different metering units with different discharge media through the opening 54 of the container part 52. In this way, more media can be introduced in a sequential order into the container part 52 in a synchronized manner. There is also the option of arranging the metering units 10, 12 in a stationary manner and to then move the mold tool 46 with the container part 52 and its opening 54 to be kept clear, under the respective metering units 10, 12, always in chronological succession, which would also be possible within the framework of a carousel arrangement. It would also be conceivable to introduce with the machine arrangement according to FIGS. 1 to 5 by the metering unit 10 first an ointment 74, then using the metering unit 12 an ointment 76 having a different viscosity in addition to the pharmaceutical effect and then in turn with the metering unit 10 the ointment 74 is applied again onto the ointment 76 in a separated manner, etc.

Analogous to the previous construction in Bottelpack manufacturing machines, the machine device presented in FIGS. 1 to 5 can be arranged on an existing bridge of the machine above the closing unit, in particular in the form of the mold tool 46 with its mold halves 48, 50, 56, 58. In this way existing, delivered machine units can be retrofitted or converted in a simple and cost-effective manner.

While one embodiment has been chosen to illustrate the invention, it will be understood by those skilled in the art that various changes and modifications can be made therein without departing from the scope of the invention as defined in the claims.

The invention claimed is:

1. A process for producing a filled and closed container in a blow molding, filling and sealing apparatus, the process comprising the steps of:
   forming an initially open container part in a mold tool having main mold halves by blow or vacuum molding in a forming position and extending along a vertical axis;
   filling the initially open container while in the mold tool through an opening facing upwardly along the vertical axis of the container part in succession with different first and second media by first and second metering units, respectively, the first metering unit being moved simultaneously vertically and horizontally in a first oblique direction downwardly and inwardly relative to the vertical axis from a first starting position spaced from the vertical axis in a first horizontal direction and spaced vertically above the opening to a dispensing position over the opening of the container part and then dispensing the first medium into an interior of the container part via the opening and then being moved simultaneously vertically and horizontally in a direction opposite the first oblique direction back to the first starting positon, the second metering unit subsequently being moved simultaneously vertically and horizontally in a second oblique direction different from the first oblique direction downwardly and inwardly relative to the vertical axis from a second starting position spaced from the vertical axis in a second horizontal direction and spaced vertically above the opening to the dispensing position over the opening of the container part and then dispensing the second medium into the interior of the container part over the first medium via the opening and then being moved simultaneously vertically and horizontally in a direction opposite the second oblique direction back to the second starting position such that the first and second media are separated from each other in the container part while the mold tool with the container part therein is stationary in the forming position during movement of the first and second metering units and the dispensing of the first and second media; and
   forming a container from the container part by closing head mold halves of the mold tool to close the container part and complete a formed, filled and sealed container.

2. A process according to claim 1 wherein
the first and second media have different viscosities.

3. A process according to claim 1 wherein
the first medium has a higher viscosity than second medium.

4. A process according to claim 3 wherein
the first medium is one of an ointment, a cream or a gel.

5. A process according to claim 4 wherein
the second medium is one of an ointment, a cream, and a gel.

6. A process according to claim 1 wherein
the second medium is dispensed into the container part without mixing of the first and second media, with separating layer being formed between the first and second media free of craters during filling of the container part.

7. A process according to claim 1 wherein
the first and second metering units are volumetric metering units.

8. A process according to claim 1 wherein
the first and second media in the container part are substantially free of air pockets.

9. A process according to claim 1 wherein
the first and second metering units move along first and second travel paths, respectively, having a common dispensing position over the opening of the container part.

10. A process according to claim 1 wherein
after the second medium is dispensed in the container part and before closing of the head mold halves, an end part is placed in the container part on the second medium with the end part being within the formed, filled and sealed container after closing of the head mold halves.

11. A process according to claim 10 wherein
the end part is shaped as a ball.

12. A process according to claim 1 wherein
the first and second metering units are fixed on first and second displacement units, respectively, said first and second displacement units moving the first and second metering units back and forth between the first and second starting positions and the dispensing position over the opening of the container part by first and second drives, respectively, having obliquely extending guides of sliding block guides.

13. A process according to claim 12 wherein the obliquely extending guides are part of the sliding block guides in base supports, the base supports having spindle drives that move brackets on which the first and second displacement units with the first and second metering units are arranged movably in vertical and horizontal directions.

14. A process according to claim 1 wherein each of the first and metering units move vertically along the vertical axis after moving in the respective oblique direction toward the dispensing position and before moving in the direction opposite the respective oblique direction toward the respective starting position.

15. A device for producing a filled and sealed container, the device comprising:

a mold tool having main mold halves capable of forming an initially open container part by blow or vacuum molding in a forming position that extends along a vertical axis and that has an opening facing upwardly along the vertical axis;

first and second metering units dispensing first and second media, respectively, filling the initially open container part in the mold tool through the opening of the container part in succession, the first metering unit being movable simultaneously vertically and horizontally in a first oblique direction downwardly and inwardly relative to the longitudinal axis by a first displacement unit and a first drive by a first skewed guide of a first sliding guide block from a first starting position spaced away from the vertical axis in a first horizontal direction and spaced vertically above the opening to a dispensing position over the opening of the container part and then dispensing the first medium into an interior of the container part and then being movable simultaneously vertically and horizontally in a direction opposite the first oblique direction back to the first starting position, the second metering unit being subsequently movable simultaneously vertically and horizontally in a second oblique direction different from the first oblique direction downwardly and inwardly relative to the vertical axis by a second displacement unit and a second drive by a second skewed guide of a second guide block from a second starting positon spaced from the vertical axis in a second horizontal direction and spaced vertically above the opening to the dispensing position over the opening of the container part and then dispensing the second medium into the interior of the container part over the first medium via the opening and then being movable simultaneously vertically and horizontally in a direction opposite the second oblique direction back to the second starting position such that the first and second media are separated from one another while the mold tool with the container part therein is stationary in the forming position during movement of said first and second metering units and dispensing of the first and second media; and head mold halves of the mold tool being closable to seal the container part closed with the first and second media therein.

16. A device according to claim 15 wherein the first and second skewed guides extend as part of the first and second sliding guide blocks in first and second base supports, respectively, the first and second base supports having first and second spindle drives, respectively, that move first and second brackets, respectively, the first and second displacement units with the first and second metering units, respectively, being movable in horizontal and vertical directions.

17. A device according to claim 15 wherein each of the first and second metering units is movable vertically along the vertical axis after moving in the respective oblique direction toward the dispensing position and before moving in the direction opposite the respective oblique direction toward the respective starting position.

18. A process for producing a filled and closed container in a blow molding, filling and sealing apparatus, the process comprising the steps of:

forming an initially open container part in a mold tool having main mold halves by blow or vacuum molding in a forming position and extending along a vertical axis;

filling the initially open container while in the mold tool through an opening facing upwardly along the vertical axis of the container part in succession with different first and second media by first and second metering units, respectively, the first metering unit being moved translationally and horizontally in a first horizontal direction relative to the vertical axis and then sequentially vertically downward along the vertical axis from a first starting position spaced from the vertical axis in the first horizontal direction and spaced vertically above the opening to a dispensing position within the opening of the container part and then dispensing the first medium into an interior of the container part via the opening and then being moved vertically upwardly along the vertical axis from within the opening and then translationally and horizontally in a direction opposite to the first horizontal direction back to the first starting positon, the second metering unit subsequently being moved translationally and horizontally in a second horizontal direction different from the first horizontal direction relative to the vertical axis and then sequentially vertically downward along the vertical axis from a second starting position spaced from the vertical axis in the second horizontal direction and spaced vertically above the opening to the dispensing position within the opening of the container part and then dispensing the second medium into the interior of the container part over the first medium via the opening and then being moved vertically upwardly along the vertical axis from within the opening and then translationally and horizontally in a direction opposite to the second horizontal direction back to the second starting position such that the first and second media are separated from each other in the container part while the mold tool with the container part therein is stationary in the forming position during movement of the first and second metering units and the dispensing of the first and second media; and forming a container from the container part by closing head mold halves of the mold tool to close the container part and complete a formed, filled and sealed container.

* * * * *